US008834771B2

(12) United States Patent
Kim et al.

(10) Patent No.: US 8,834,771 B2
(45) Date of Patent: Sep. 16, 2014

(54) APPLIANCE HAVING MICRO-PATTERN AND METHOD FOR FABRICATING STRUCTURE HAVING MICRO-PATTERN FOR APPLIANCE

(75) Inventors: Young Bae Kim, Changwon-si (KR); Young Kyu Kim, Changwon-si (KR)

(73) Assignee: LG Electronics Inc., Seoul (KR)

( * ) Notice: Subject to any disclaimer, the term of this patent is extended or adjusted under 35 U.S.C. 154(b) by 346 days.

(21) Appl. No.: 13/145,297

(22) PCT Filed: Jan. 6, 2010

(86) PCT No.: PCT/KR2010/000055
§ 371 (c)(1),
(2), (4) Date: Jul. 19, 2011

(87) PCT Pub. No.: WO2010/085052
PCT Pub. Date: Jul. 29, 2010

(65) Prior Publication Data
US 2011/0279000 A1 Nov. 17, 2011

(30) Foreign Application Priority Data

Jan. 20, 2009 (KR) ........................ 10-2009-0004517

(51) Int. Cl.
*B29C 45/73* (2006.01)
*G03H 1/00* (2006.01)
*F25D 23/02* (2006.01)
*G03H 1/02* (2006.01)
*F25D 25/02* (2006.01)
*G03H 1/04* (2006.01)

(52) U.S. Cl.
CPC ..... *G03H 1/0005* (2013.01); *G03H 2001/0284* (2013.01); *G03H 2001/0055* (2013.01); *F25D 25/025* (2013.01); *F25D 2400/18* (2013.01); *G03H 2260/14* (2013.01); *G03H 2001/043* (2013.01); *G03H 2270/52* (2013.01); *G03H 2001/0288* (2013.01); *G03H 1/0244* (2013.01); *G03H 2001/0296* (2013.01); *G03H 2227/04* (2013.01); *G03H 1/0252* (2013.01); *G03H 1/0276* (2013.01); *G03H 2250/36* (2013.01); *F25D 23/02* (2013.01); *G03H 2250/39* (2013.01)
USPC ................ 264/328.16; 264/319; 264/328.1; 264/328.14; 264/219; 264/299; 425/129.1; 425/548; 425/552; 425/547

(58) Field of Classification Search
USPC ............ 264/299, 319, 328.1, 328.14, 328.16, 264/328.17, 129, 250; 425/129.1, 548, 552, 425/595, 547
See application file for complete search history.

(56) References Cited

U.S. PATENT DOCUMENTS 5,071,597 A    12/1991   D'Amato et al.
5,275,864 A *  1/1994   Kenmochi ................... 428/156

(Continued)

FOREIGN PATENT DOCUMENTS

CN          1746601 A     3/2006
EP       0 400 672 A2   12/1990

(Continued)

*Primary Examiner* — Amjad Abraham
*Assistant Examiner* — Ninh Le
(74) *Attorney, Agent, or Firm* — Birch, Stewart, Kolasch & Birch, LLP

(57) ABSTRACT

The present invention relates to an appliance having a micro-pattern (190*b*) for displaying a pattern or a character, and a method for fabricating a structure having a micro-pattern (190*b*), and more particularly, to a method for displaying a pattern or a character more effectively. To achieve above object, the appliance of the present invention includes a body, a structure provided to an outside or an inside of the body, and a micro-pattern (190*b*) for changing a light incident thereon from an outside of the micro-pattern to a light of a predetermined color to display a predetermined character or a predetermined pattern on the structure.

7 Claims, 16 Drawing Sheets
(2 of 16 Drawing Sheet(s) Filed in Color)

(56) References Cited

U.S. PATENT DOCUMENTS

| | | | |
|---|---|---|---|
| 6,955,781 B2* | 10/2005 | Yusa et al. | 264/162 |
| 2004/0234752 A1* | 11/2004 | Arnold et al. | 428/336 |
| 2006/0141197 A1 | 6/2006 | Caparros Taracido et al. | |
| 2008/0054527 A1* | 3/2008 | Kang | 264/327 |
| 2009/0053350 A1* | 2/2009 | Sevigny | 425/149 |

FOREIGN PATENT DOCUMENTS

| | | |
|---|---|---|
| JP | 9-269717 A | 10/1997 |
| JP | 2003-79488 A | 3/2003 |
| JP | 2003-159900 A | 6/2003 |
| JP | 4048762 B2 | 2/2008 |
| WO | WO 2004/009336 A1 | 1/2004 |

* cited by examiner (a)

(b)

(c)

(a)

(b)

(c)

(a)

(b)

(c)

(a)

(b)

(c)

APPLIANCE HAVING MICRO-PATTERN AND METHOD FOR FABRICATING STRUCTURE HAVING MICRO-PATTERN FOR APPLIANCE

TECHNICAL FIELD

The present invention relates to an appliance having a micro-pattern, and a method for fabricating a structure having micro-pattern for appliance, and more particularly, the present invention relates to an invention which enables to display a pattern or a character by using a light incident onto an appliance for enhancing a decorative effect of the appliance and to display the pattern or the character more easily and economically.

BACKGROUND ART

In a case of an appliance, such as a refrigerator, an air conditioner and a cooking utensil, emphasizing only functions, people have seldom displayed a decorative member, such as the pattern or character, on an exterior of the appliance.

However, as purchasing levels or senses of beauty of consumers become the higher, overcoming an image of the appliances that the appliances are functional products that provide convenience of life to the consumers, a trend takes place, in which the appliances are interiors that decorate a room.

Accordingly, currently the trend is reflected to the appliances by forming beautiful patterns or characters on the exterior of the appliance.

In general, as a method for forming a pattern or character on the exterior of the appliance of plastic, a silk screen has been used. The pattern or character can be formed by using the silk screen by the following method.

That is, a mesh having ink applied thereto is placed on a screen having the pattern or character, and the plastic, an exterior surface of the appliance, is placed on an underside of a mask.

Under this state, a pressing member is moved in front/rear, left/right directions while pressing the mesh with the pressing member, making the ink at the mesh to pass through the pattern or character and stick to the plastic.

By repeating above step for a few or tens of times, a desired pattern or character can be transcribed to the plastic. However, this method has problems in that the few or tens of times of repetition is required, and the patterns or characters which can be produced with the silk screen are limited.

DISCLOSURE

Technical Problem

To solve the problems, an object of the present invention is to provide an invention that can form a character or a pattern on an exterior or an inside of an appliance, more quickly and economically Another object of the present invention is to provide an invention that enables a plurality of colors or lights are displayed from a character or a pattern formed on an appliance owing to a light incident on the appliance.

Technical Solution

To achieve these objects and other advantages and in accordance with the purpose of the invention, as embodied and broadly described herein, an appliance includes a body, an object provided to an outside or an inside of the body, and a micro-pattern for changing a light incident thereon from an outside of the micro-pattern to a light of a predetermined color to display a predetermined character or a predetermined pattern on the structure.

The micro-pattern is plural for refracting the light incident thereon to change the light into colorful lights.

The micro-pattern is formed to have a shape that can embody a hologram effect.

The micro-pattern has a pitch of 20 nm~2 mm for refracting visible lights of the lights incident on the micro-pattern.

The appliance further includes a metal layer deposited on an outside surface of the micro-pattern for displaying a predetermined pattern or character to an outside of the micro-pattern.

The appliance further includes a protective coating layer deposited on an outside surface of the metal layer for protecting the micro-pattern.

The protective coating layer is formed of a transparent material.

The structure includes a curved surface, and the micro-pattern is formed on the curved surface.

The body is a refrigerator body including the storage box mounted thereto, and the structure is a display member or a decorative member mounted to an outside surface of the storage box.

The structure is a front panel which forms an outside surface of the appliance, and the micro-pattern is formed on the front panel to have a predetermined pattern or picture with lights of a plurality of colors.

The appliance is either a refrigerator, or an indoor unit of an air conditioner, or a cooking utensil.

In another aspect of the present invention, a method for fabricating a structure having a micro-pattern for an appliance, the structure formed on a basic structure provided to an outside or an inside of a body of the appliance, for changing a light incident thereon from an outside of the appliance to display a predetermined pattern or character, the method includes (a) a stamper fastening step for fastening a stamper having a predetermined pattern arranged between a first mold unit and a second mold unit, (b) a stamper heating step for heating the stamper, (c) a mold unit moving step for bringing the first and second mold units into close contact to form an enclosed cavity between the first mold unit and the second mold unit, (d) a resin introducing step for introducing molten resin to the cavity between the first and second mold units, (e) a cooling down step for cooling down the first and second mold units and the stamper after finishing the resin introducing step, and (f) a mold unit separating step for making the first and second mold units to move away from each other for taking out the structure having the micro-pattern on the stamper transcribed thereto.

The stamper fastening step includes the step of fastening the stamper either to the first mold unit or the second mold unit by vacuum absorption.

The stamper fastening step further includes the step of fastening the stamper by means of a clamp provided to either the first mold unit or the second mold unit.

The stamper heating step includes the step of raising a surface temperature of the stamper higher than a glass transition temperature of the resin before the resin introducing step.

The stamper heating step further includes the step of putting a heater built-in one of the first mold unit or the second mold unit into operation, whereby heating the stamper.

The stamper cooling down step includes the step of bringing a cooling mold connected to one of the first mold unit and the second mold unit having the stamper fastened thereto into contact with the mold unit having the cooling mold connected thereto, whereby cooling the stamper.

The method further includes the steps of depositing a metal such that a pattern or a character by the micro-pattern is sensed, and applying a protective coating on an upper surface of the metal deposited thus.

Advantageous Effects

The present invention has following advantageous effects.

The pattern or character can be formed on an inside or an outside of the appliance more quickly and economically.

A sense of beauty of a product can be enhanced by making a plurality of lights emitted from a surface of the pattern or character formed on an inside or an outside of the appliance owing to a light incident on the appliance.

DESCRIPTION OF DRAWINGS

The patent or application file contains at least one color drawing. Copies of this patent or patent application publication with color drawing will be provided by the USPTO upon request and payment of the necessary fee.

MODE FOR INVENTION

Reference will now be made in detail to the specific embodiments of the present invention, examples of which are illustrated in the accompanying drawings.

Figure 1:
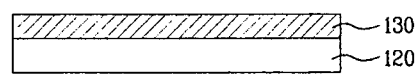
FIGS. 1 and 2 illustrate diagrams showing the steps of a method for fabricating a stamper by the LIGA system.
Figure 1:
Figure 1:
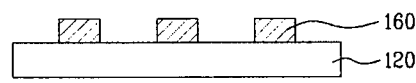

The steps of a method for fabricating a structure having a micro-pattern in accordance with a preferred embodiment of the present invention will be described with reference to FIG. 1.

Referring to FIG. 1A, it is required that a process for fabricating a stamp for transcribing a desired pattern is preceded. For this, a sensitizing solution 130 is applied to a flat substrate 120. Then, as shown in FIG. 1B, a mask 140 having a pattern is placed over the flat substrate 120, and a light is directed to an upper side of the mask 140.

Then, referring to FIG. 1C, a pattern 160 corresponding to the pattern printed on the mask 140 is formed on an upper side surface of the flat substrate 120.

In this instance, it is preferable that the pattern 160 has a nano or micron sized.

For making metal plating required for fabrication of a stamper, a metal seed layer 170 is coated on the substrate 120 and the pattern 160.

Figure 2:
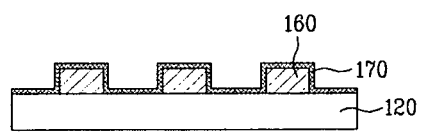
Figure 2:
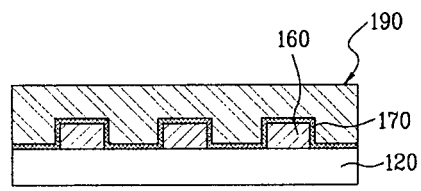
Figure 2:
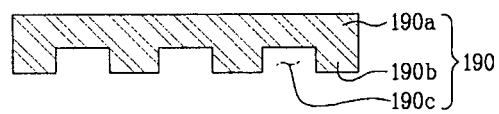

Referring to FIG. 2B, a structure of nickel or copper is formed on the micro-pattern having the metal seed layer 170 coated thereon to cover the metal seed layer 170 by electroforming, and then, referring to FIG. 2C, the structure formed by the electroforming is removed, to fabricate a stamper 190 having the pattern formed thereon.

The stamper 190 includes a stamper body portion 190a which forms a body of the stamper 190, a micro-pattern 190b formed on a surface of the stamper body portion 190a for transcribing to the substrate 120 as the pattern 160, and spaces 190c between the micro-patterns.

Such a stamper fabrication process is called as LIGA (Lithographie, Galvanoformug, Abformung in German).

In the meantime, the AAO (Anodized Aluminum Oxide) process will be described, in which the stamper is fabricated in a method other than the LIGA process.

Figure 3:
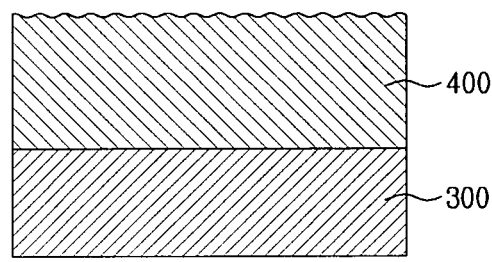
FIGS. 3 to 10 illustrate diagrams showing the steps of a method for fabricating a stamper by the AAO system.
Figure 4:
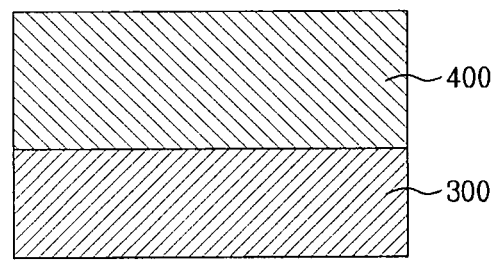

Referring to FIG. 3, in the stamper fabrication process for providing the stamper of metal, a metal 400 like aluminum Al is deposited on the substrate 300 to a thickness of 5~10 μm, and as shown in FIG. 4, electropolishing is performed to make a surface roughness to be, preferably, below 3~5 nm.

Figure 5:
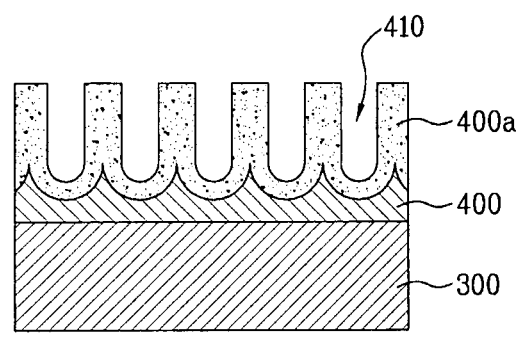
Figure 6:
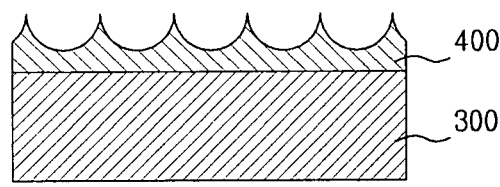
Figure 7:
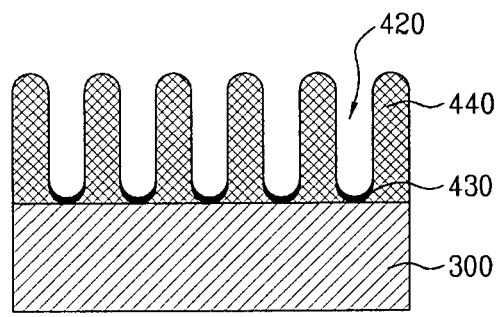

Referring to FIG. 5, an anodic oxidation step as shown in FIG. 5, an etching step as shown in FIG. 6, and a second anodic oxidation step as shown in FIG. 7 are performed, to fabricate a stamper of a metal oxide having regular distribution of nano or micron sized patterns 410 or holes with regular pitches or radii.

Each of the steps will be described in detail. Referring to FIG. 5, upon performing the first anodic oxidation, a portion of the aluminum layer 400 makes contact with an electrolyte to turn to alumina $Al_2O_3$ 400a to form a micro-pattern 410 having a depth.

Then, referring to FIG. 6, an etching is performed to remove the alumina formed in the first anodic oxidation, to leave only aluminum 400 on the upper surface of the substrate 300.

Then, referring to FIG. 7, the second anodic oxidation is performed to turn the aluminum into alumina 440. In this step, the micro-pattern 420 is made to have a depth approaching to a surface of the substrate 300, and a greater width.

In this step, a barrier layer 430 is formed between the micro-pattern 420 and the substrate 300 as a by-product of the anodic oxidation.

Figure 8:
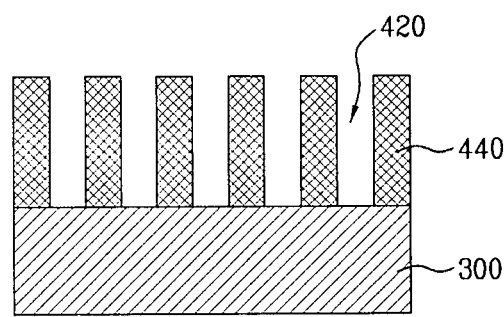

Upon removal of the barrier layer 430 with an acid solution, a stamper having a micro-pattern as shown in FIG. 8 is obtained.

Figure 9:
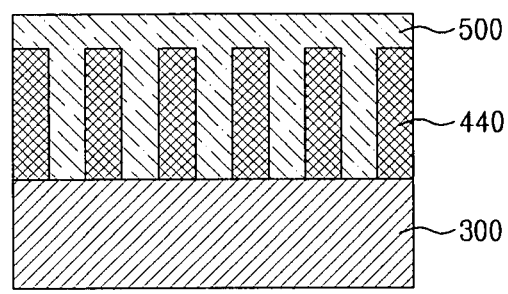
Figure 10:
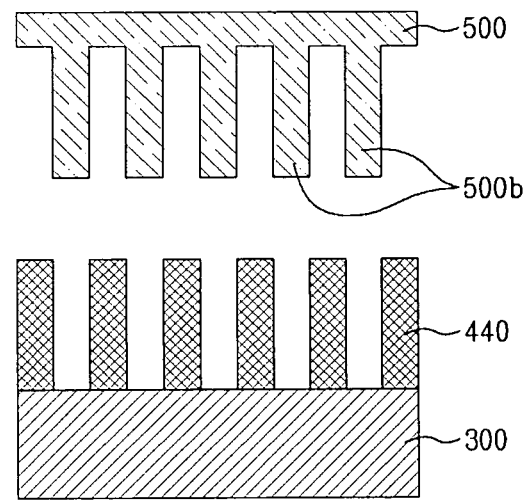

Then, referring to FIG. 9, a structure 500 of nickel Ni or copper Cu is formed by electroforming to cover the micro-pattern, and, referring to FIG. 10, the structure 500 is removed from the substrate to obtain an endurable stamper 500 having a micro-pattern 500b.

Thus, the AAO method enables an accurate and reproducible control in fabrication of a stamper having a desired pattern at a low cost, simply.

In the meantime, in a case the stamper is fabricated by the LIGA process or the AAO process, by adjusting a pitch of the pattern, it is possible that the structure transcribed from the pattern displays hologram.

That is, when the user looks at a portion of the appliance where the structure transcribed from the micro-pattern is mounted thereto, a color of a surface of the structure varies with a direction of view, thereby embodying the hologram effect.

A reason the hologram effect appears will be described later.

A process for fabricating a light source cover member by using the stamper fabricated by above method will be described.

Though there are hot stamping, injection molding or the like in the methods, the injection molding will be described, which enables fast fabrication of a product.

Figure 11:
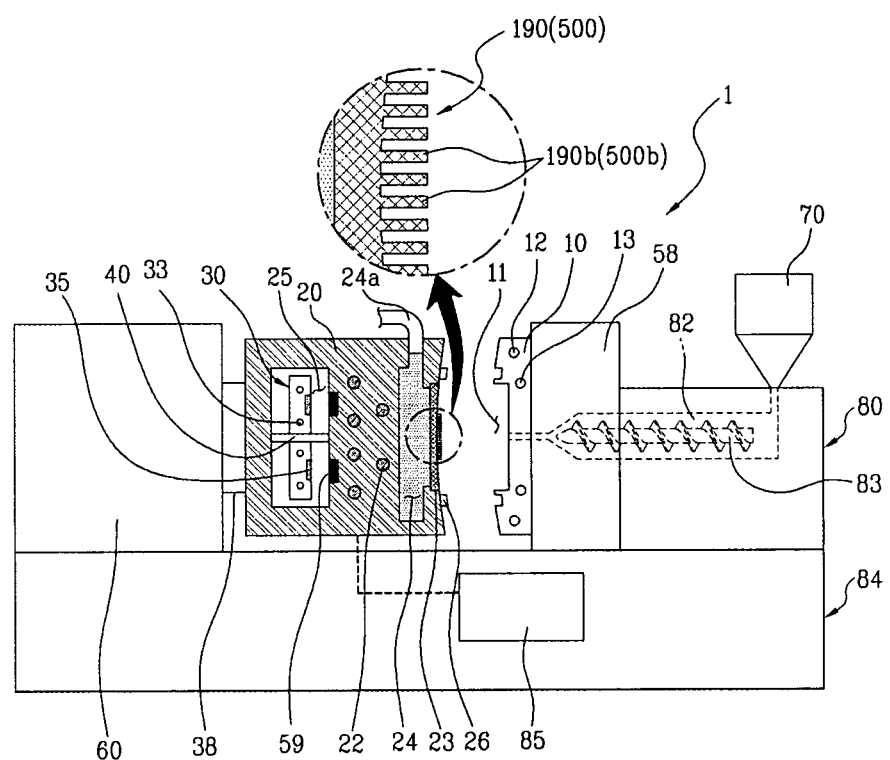
FIGS. 11 to 14 illustrate diagrams showing injection molding machines and injection molding steps for injection molding a structure having a micro-pattern in accordance with a preferred embodiment of the present invention.

An injection molding machine 1 which uses the stamper having the micro-pattern of the present invention will be described, with reference to FIG. 11.

The injection molding machine includes a first metal mold unit 10 and a second mold unit 20. The first mold 10 has a cavity 11 that is a space for introduction of molten resin thereto.

It is preferable that the first mold unit 10 has a heating device, such as a first heater 13, for preventing the resin from solidifying at the time of the injection molding, and a cooling water flow passage 12 for flow of cooling water therethrough, built therein.

The second mold unit 20 has a second heater 22 for heating the second mold unit 20, and a cooling mold 30 in rear of the second heater 22 for cooling the second mold unit 20, built therein.

The cooling mold 30 is movably mounted in a housing 25 provided separately in the second mold unit 20. The housing 25 has a guide member 40 provided therein for guiding movement of the cooling mold 30.

An electric magnet 35 and a permanent magnet 59 are mounted to the cooling mold 30 and the second mold unit 20 respectively.

The electric magnets 35 and the permanent magnets 59 are mounted, for applying a predetermined intensity of current to the electric magnet 35 to generate an attractive force, or repulsive force, between the electric magnet and the permanent magnet.

If the attractive force is generated, the cooling mold 30 is brought into contact with the second mold unit 20, to cool down the second mold unit 20.

The same effect will be provided even if positions of the electric magnet 35 and the permanent magnet 59 are exchanged, or another electric magnet is provided instead of the permanent magnet 59.

The cooling mold 30 has a cooling water flow passage 33 formed therein for introducing cooling water thereto.

If the cooling water is introduced to the cooling water flow passage 33, the second mold unit 20 and the stamper 190,500 are cooled down, rapidly.

Owing to this, the resin filled in the first and second mold unit 10 and 20 solidifies enabling to form a product.

In the meantime, there are a first mold supporting block 58 at one side of the first mold unit 10 for supporting the first mold unit 10, and a second mold supporting block 60 spaced a distance from the first mold supporting block 58 for supporting the second mold unit 20.

In rear of the second mold unit 30, there is a mold moving unit 38 projected from the second mold supporting block 60 for moving the second mold unit 20 to or away from the first mold unit 10.

On one side of the first mold supporting block 58, there is a resin supply unit 80 for moving the molten resin toward the first mold unit 10, with a hopper 70 mounted thereon for receiving the molten resin.

In order to guide the molten resin from an outlet of the hopper 70 to the first mold unit 10, there is a resin flow passage 82 passed through the resin supply unit 80, the first mold supporting block 60 and the first mold unit 10, and preferably having a screw 83 for moving the molten resin to the first mold unit 10, quickly.

Under the first and second mold supporting blocks 58 and 60 and the resin supply unit 80, there is a base block 84 for supporting them.

In the meantime, at one side of the second mold unit 20, there is a stamper attachment portion 23 provided thereto for attaching the stamper 190 or 500 thereto, and in rear of the stamper attachment portion 23, there is an absorbing space 24 for fixedly absorbing the stamper 190 or 500.

At one side of the absorbing space 24, there is a vacuum flow pipe 24a connected to a compressor (not shown) for forming a vacuum.

In the vicinity of the stamper attachment portion 23, there is a clamp 26 for fastening the stamper 190 or 500.

Though the drawing shows an enlarged view of the micro-pattern 190b or 500b on the stamper for showing the micro-pattern 190b or 500b clearly, the micro-pattern 190b or 500b is invisible with naked eyes, actually.

The stamper 190 or 500, formed of a metal like nickel, has in general a surface temperature significantly lower than the molten resin used in the injection molding.

Therefore, since there is a problem in that the resin solidifies before the micro-pattern 190b or 500b is patterned to the mold perfectly if the stamper 190 or 500 having a relatively low temperature and the molten resin having a high temperature are brought into contact, it is required to maintain surface temperatures of the stamper 190 or 500 and the mold to be higher than a glass transition temperature of a polymer of the resin.

The glass transition temperature is a temperature at which a polymer becomes to have activity and begins to move. The polymer resin is in a solid state at a temperature below the glass transition temperature, and if the polymer resin is at a temperature higher than the glass transition temperature, the polymer resin turns to have elasticity, like rubber, and if the temperature becomes higher, the polymer resin turns to liquid at the end.

Accordingly, it is required that a liquid state of the resin is maintained for a predetermined time period for forming a pattern the same with the micro pattern on the stamper on a product of the resin exactly as the liquid resin is brought into contact with the stamper 190 or 500. Therefore, it is required that the surface temperature of the stamper is at the glass transition temperature for the time period.

In the meantime, a temperature control unit 85 is provided to the base block 84 of the injection molding machine.

Since a main purpose of the cooling mold 30 and the second heater 22 mounted to the second mold unit 20 is fast heating and fast cooling of the stamper 190 or 500, mostly the temperature control unit 85 serves to make fast temperature control of the surface of the stamper 190 or 500.

Injection molding of a structure to which the micro-pattern 190b or 500b is to be transcribed with the stamper 190 or 500 having the micro-pattern 190b or 500b formed thereon in accordance with a first preferred embodiment of the present invention will be described.

Figure 12:
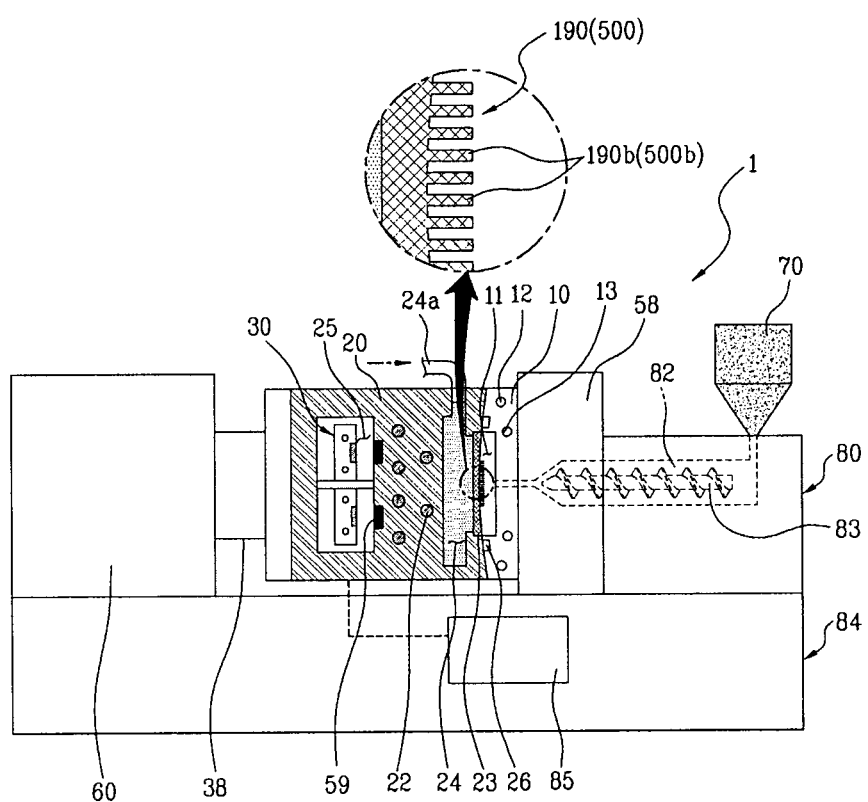

Referring to FIG. 12, the stamper 190 or 500 having the micro-pattern 190b or 500b formed thereon is fastened to the stamper attachment portion 23 of the second mold unit 20.

Then, upon putting the compressor (not shown) into operation, a vacuum is formed at the vacuum space 24, fastening the stamper 190 or 500 to the second mold unit 20.

Then, the clamp 26 is moved to fix ends of the stamper 190 or 500 such that the stamper 190 or 500 is immovable.

Then, upon applying an operation button to give an instruction that the first and second mold unit 10 and 20 are heated until temperatures thereof are higher than certain temperatures, currents flow to the first and second heaters 13 and 22 to heat the first and second mold unit 10 and 20 by heat resistance, respectively.

The heating of the first and second mold units 10 and 20 also heats the stamper 190 or 500 higher than a predetermined temperature.

In general, a time period in which the stamper 190 or 500 reaches to the predetermined temperature, for an example, the glass transition temperature, is around one minute from right after the heaters are put into operation.

In this instance, since a current flow to the electric magnet 35 to generate repulsive force between the permanent magnet 59 and the electric magnet 35, the second mold unit 20 and the cooling mold unit 30 maintain a spaced state.

While the second mold unit 20 and the cooling mold 30 and a heated state of the first and second mold units 10 and 20 maintain the spaced state, and the stamper 190 or 500 maintains the heated state, and as shown in FIG. 12, if the second mold unit 20 moves to the first mold unit 10 to bring the second mold unit 20 into close contact with the first mold unit 10, an enclosed cavity 11 of a shape of the product is formed between the first mold unit 10 and the stamper 190 or 500.

Figure 13:
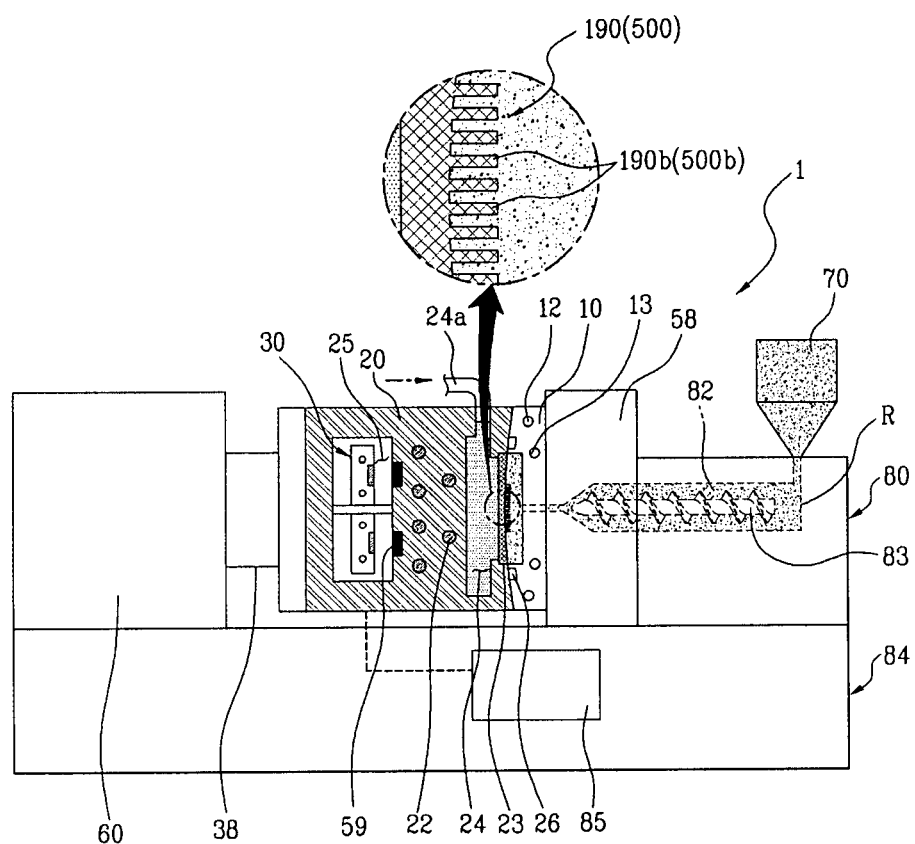

Referring to FIG. 13, in a state the second mold unit 20 and the first mold unit 10 are in close contact to form the enclosed cavity 11, the molten resin R is introduced to the cavity 11 by means of the screw 83 in the resin flow passage to fill the cavity 11.

The molten resin infiltrates between the micro-pattern 190b or 500b on the stamper 190 or 500, to copy the micro-pattern 190b or 500b as it is.

Then, if the first and second heaters 13 and 22 are turned off, and a repulsive force is generated between the electric magnet 35 and the permanent magnet 59, the cooling mold 30 is brought into contact with the second mold 20.

At the same time with this, if the cooling water is introduced to the cooling water flow passage 33 in the cooling mold 30 and the cooling water flow passage 12 in the first mold 10, the first and second mold units 10 and 20 and the stamper 190 or 500 are cooled, to solidify the resin filled in the cavity 11.

Figure 14:
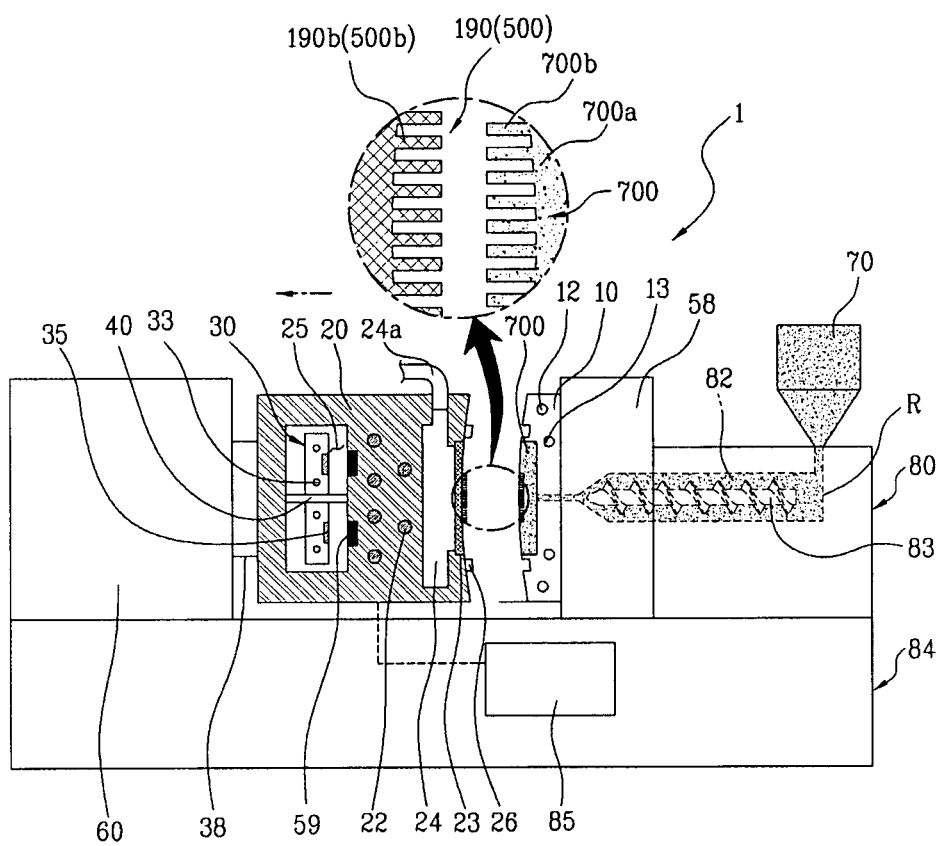

Then, referring to FIG. 14, the second mold 20 is moved away from the first mold unit 10, to obtain a fixed structure 700 having the micro-pattern 190b or 500b on the stamper 190 or 500 patterned thereto from the cavity 11.

In this instance, the structure 700 includes a body portion 700a and micro-patterns 700b spaced from one another projected from the body portion 700a.

The micro-pattern 700b is formed on the structure thus for making a light incident on the structure 700 from a front side of the structure 700 to refract and interfere, thereby embodying an hologram effect on an outside surface of the structure 700.

In the meantime, if spaces of the micro-pattern 190b or 500b on the stamper 190 or 500 are adjusted, to make the space greater or smaller, a path of the light changes.

According to this, a wavelength of the light that refracts or interferes at the micro-pattern 190b or 500b of the structure 700 changes.

Figure 15:
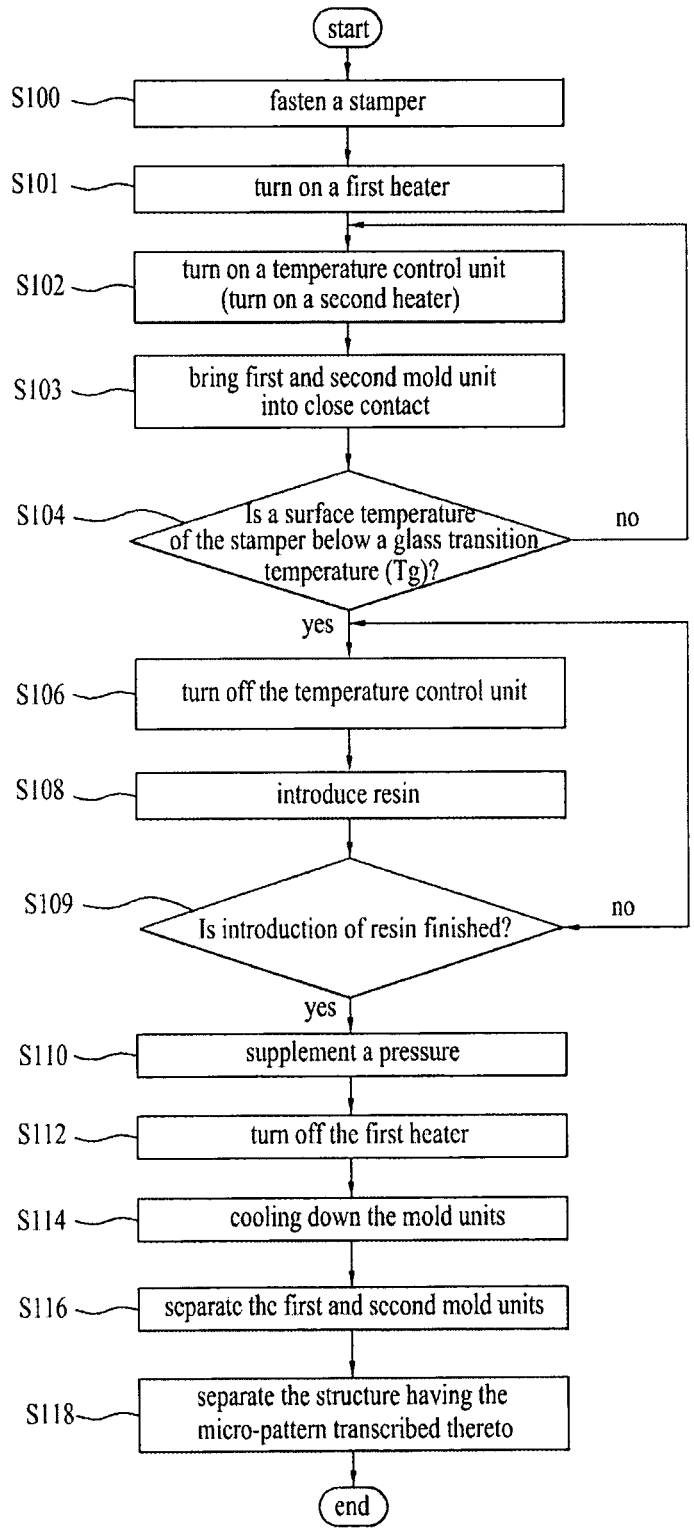
FIG. 15 illustrates a flow chart showing the steps of a method for injection molding of a product.

A method for fabricating a light source cover member according to above steps will be described, briefly. Referring to FIG. 15, upon reception of an instruction for an injection molding, the clamp fastens the stamper to the second mold unit at the same time with formation of a vacuum at the vacuum space in the second mold unit such that the second mold unit fixedly absorbs the stamper (S100).

The first mold unit is heated with the first heater (S101), and the temperature control unit is turned on to raise a temperature of the stamper (S102), when the second heater is also turned on to heat the second mold unit and the stamper.

In this instance, the cooling mold is spaced from the second mold, allowing heat from the second heater is transmitted to the stamper without interference.

In this state, the second mold unit is brought into close contact with the first mold unit (S103), and in this state, it is determined whether a temperature of the stamper is lower than the glass transition temperature Tg or not, and if determined lower, it is made that the heat keeps transmitted to the stamper, and if determined higher (S104), the temperature control unit is turned off to stop supply of the heat to the stamper (S105), and the resin is supplied to the cavity (S108).

This is because fluidity of the resin can be secured by heat remained at the stamper even if the heat supply to the stamper is stopped, and in general, a time period in which the resin is introduced and solidified is comparatively short in the injection molding.

Then, after finish of the supply of the resin is determined (S109), and making a pressure supplementing step in which air is supplied so that the resin is stuffed adequately (S110), the first heater is turned off (S112), and the first and second mold units are cooled down (S114).

The first mold unit is cooled down by supplying cooling water to the cooling water flow passage in the first mold unit and the second mold unit and the stamper are cooled down as the cooling mold having the cooling water flow passage provided thereto is brought into contact with the second mold unit.

Then, if it is determined that the cooling is made to a certain extent, the first mold unit is separated from the second mold unit (S116), and the structure having the micro-pattern transcribed thereto is taken out of the first mold unit, thereby finishing the injection molding (S118).

A whole structure of the structure 700 having the micro-pattern 700b formed thereon will be described.

Figure 16:
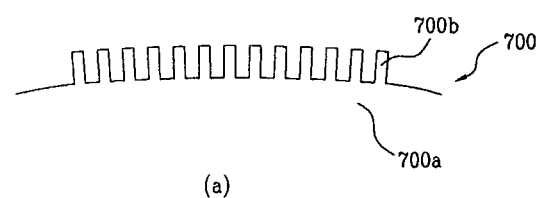
FIG. 16 illustrates a diagram showing the steps of a method for forming a metal and a protective coating on a structure in accordance with a preferred embodiment of the present invention.
Figure 16:
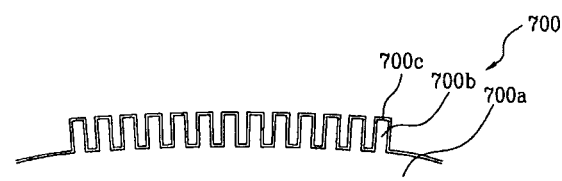
Figure 16:
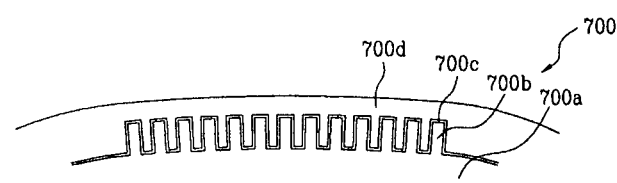

Referring to FIG. 16A, upon finishing the injection molding, the micro-pattern 700b is projected from an outside surface of the body portion 700a of the structure 700, with a plurality of the micro-patterns 700b formed spaced from one another.

It is preferable that the space between the micro-patterns 700b is in a range 20 nm~2 μm so that the space refracts a visible light (wavelength are 400~750 nm), and the visible light refracted thus makes constructive interference or a destructive interference.

Referring to FIG. 16B, a metal 700c, such as Al, Ni, Cu, and Cr, is deposited on an outside surface of the micro-patterns 700b and an outside surface of the structure, for making the characters or the patterns from the micro-patterns 700b visible externally, clearly.

Referring to FIG. 16C, upon finishing the deposition of the metal 700c, a protective coating layer 700d is applied thereon, for preventing the micro-patterns 700b from making directing contact with foreign matters, thereby preventing the micro-patterns 700b suffering from damage.

Since the protective coating layer 700d is transparent and formed of a medium that induces the same refraction, an extent of refraction of the light that is incident on the micro-patterns 700b from an outside of the structure 700 and reflected and refracted at micro-patterns 700b can be enhanced. Owing to this, the constructive interference and the destructive interference takes place actively, making the light to be sensed from an outside of the structure 700.

Figure 17:
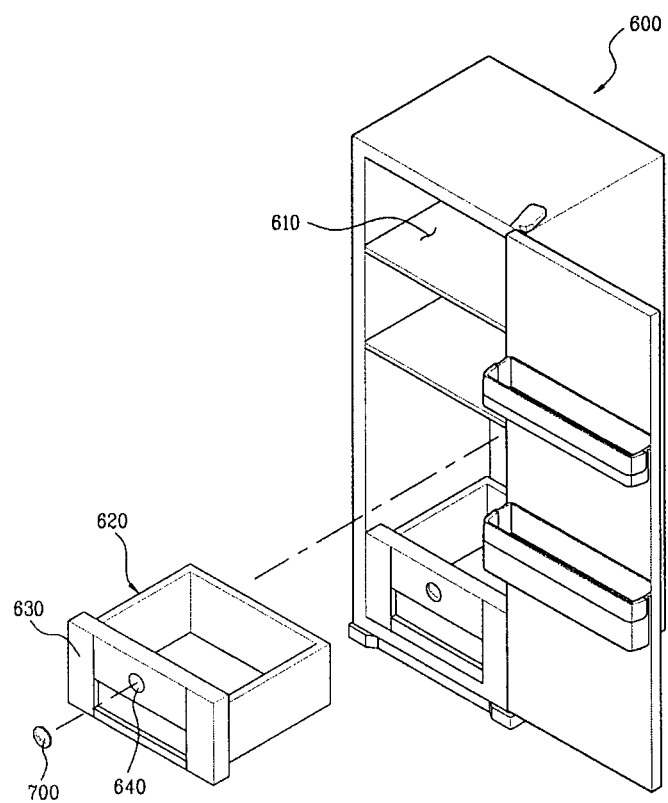
FIG. 17 illustrates a perspective view of a refrigerator having a structure of the present invention mounted thereto.

FIG. 17 illustrates a refrigerator having the structure 700 mounted thereto. The refrigerator has a storage chamber 610 provided therein with a storage box 620 mounted therein for storage of storage objects.

The structure 700 is mounted to a front 630 of the storage box 620 having a mounting recess 640 for mounting the structure thereto.

Accordingly, the structure 700 serves as a decorative member for decorating the front of the storage box 620.

Figure 18:
FIGS. 18 and 19 illustrate photographs of structures to be mounted to refrigerators.
Figure 19:
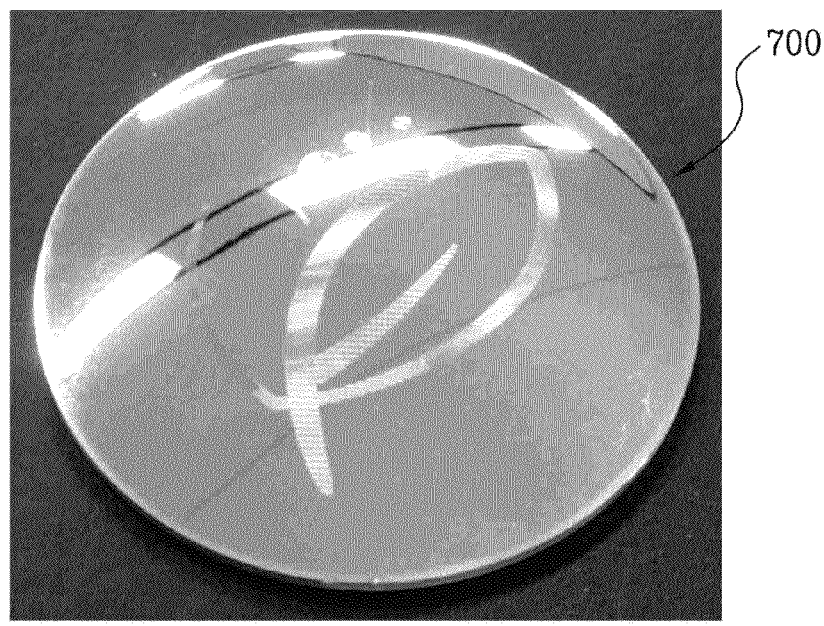

FIGS. 18 and 19 illustrate the structures 700 each having a pattern of the micro-patterns 700*b*, displaying colorful lights owing to the refraction, reflection and interference of the light.

Figure 20:
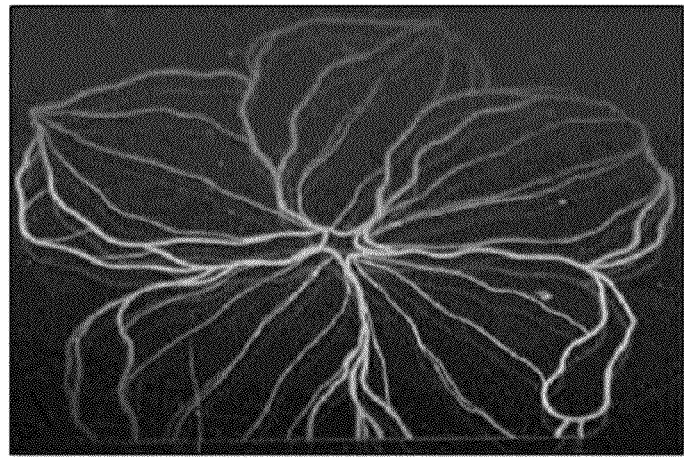
FIG. 20 illustrates photographs of structures to be mounted to other appliances.
Figure 20:
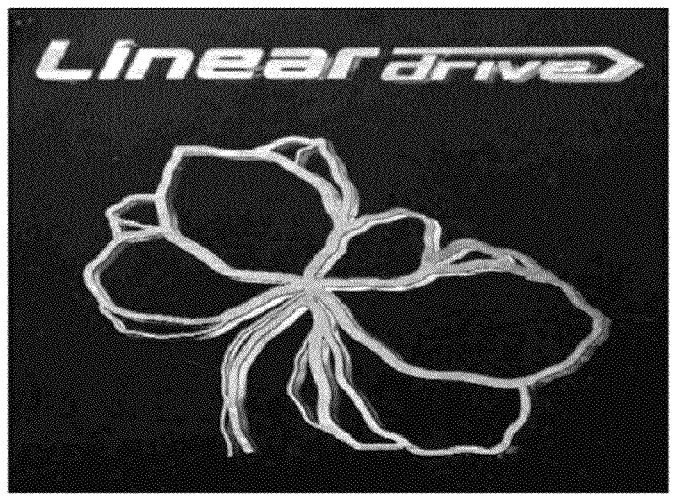
Figure 20:
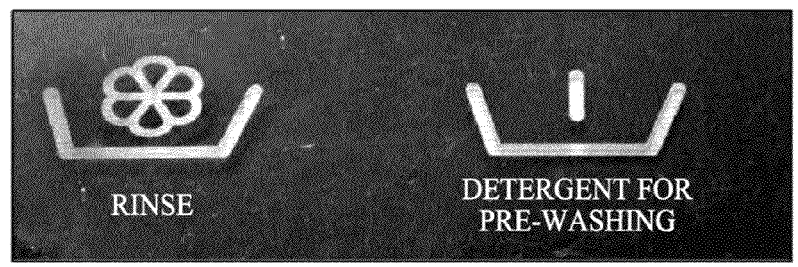

In the meantime, FIGS. 20A~20C illustrate patterns and characters formed on a front panel of an indoor unit of an air conditioner, a front panel of a door of a refrigerator, or a front control panel or a front panel of a washing machine or a cooking utensil, wherein it seems that the patterns and the characters emit lights emit when the patterns and the characters are seen from an outside of the structure.

Figure 21:
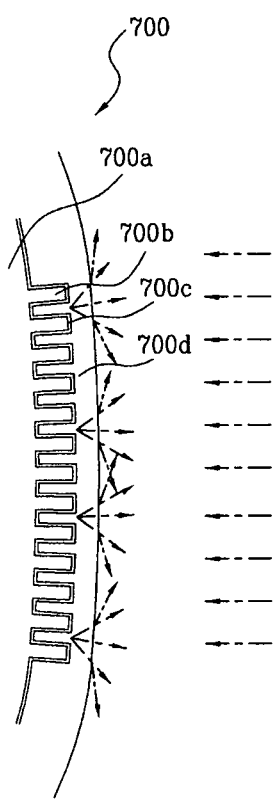
FIG. 21 illustrates a section showing shifting and changing of a light at a structure of the present invention.

FIG. 21 illustrates a diagram showing reflection, refraction and interference of a light after the light is incident on the structure.

A light has characteristics of a particle as well as a wave, to show an interference phenomenon that is a characteristic of the wave. The interference is a phenomenon in which amplitude of a wave is augmented (Constructive interference) when phases of the wave are the same, and the amplitude of the wave is diminished (Destructive interference) when phases of the wave are opposite.

If a white color meets with a medium to cause interference, a particular wave band causes constructive interference and the other wave band causes destructive interference, to display colors.

If the light transmitting through the air passes through other medium, i.e., the protective coating 700*d*, a portion thereof is reflected and the other portion thereof passes through the micro pattern 700*b* and the metal deposit layer 700*c* if the light is incident on the micro pattern 700*b* and the metal deposit layer 700*c* after the light is refracted at the protective coating 700*d*.

In this instance, the light passed through thus meets with the next the micro pattern 700*b* and the metal deposit layer 700*c*, and a portion thereof is reflected and the other portion thereof passes the micro pattern 700*b* and the metal deposit layer 700*c*, again. Such steps are repeated for a number of times.

Even in a case the light is reflected to go out of the structure, the light is refracted again when the light enters into an outside air layer from the protective coating 700*d*.

In this instance, in each of the steps, if the lights refracted after reflected have the same with phases, the constructive interference takes place, and if the lights refracted after reflected have opposite phases, the destructive interference takes place.

Owing to disappearance and mixing of the lights caused by the destructive interference and the constructive interference, the colorful lights can be seen from an outside of the structure.

In the meantime, sometimes the color changes or disappears depending on a structure of the micro pattern 700*b*.

If an interval of the micro patterns 190*b* or 500*b* on the stamper is adjusted, to make the interval of the micro pattern 700*b* to be formed on the structure 700 greater or smaller, the path of the light is changed, to cause the constructive interference, i.e., a wavelength of the reflected light is also changed.

Depending on an angle of the light incident on the micro pattern, a color of the reflected light also changes.

By taking the micro pattern 700*b*, the characteristic of the light incident on the micro pattern 700*b*, and a direction of user'eyes, i.e., an indent direction of the light, into account, and by adjusting pitches of the micro patterns 700*b* and widths of the micro patterns 700*b* themselves, it can be made possible that a color is sensed externally, and the color varies with the direction of eyes.

In this instance, it is preferable that the pitch between the micro patterns 700*b* at which the color can be made to be displayed is set to be 20 nm~2 mm taking wavelengths of visible lights into account. In this instance, the width and the pitch of the micro patterns 700*b* may vary partly throughout the structure 700, for making the color of the light emitted from different parts to vary.

The invention claimed is:

1. A method for fabricating a structure having a micro-pattern for an appliance, the structure provided on an object provided to an outside or an inside of a body of the appliance, for changing a light incident thereon from an outside of the appliance to display a predetermined pattern or character, the method comprising:
   (a) a stamper fastening step for fastening a stamper having a predetermined pattern arranged between a first mold unit and a second mold unit;
   (b) a stamper heating step for heating the stamper;
   (c) a mold unit moving step for bringing the first and second mold units into close contact to form an enclosed cavity between the first mold unit and the second mold unit;
   (d) a resin introducing step for introducing molten resin to the cavity between the first and second mold units;
   (e) a cooling down step for cooling down the first and second mold units and the stamper after finishing the resin introducing step;
   (f) a mold unit separating step for making the first and second mold units move away from each other for taking out the structure having the micro-pattern on the stamper transcribed wherein the stamper cooling down step further comprises bringing a cooling block movably mounted in the second mold unit and separated from the second mold unit into contact with the second mold unit, the stamper being connected to the second mold, thereby cooling the stamper thereto:
   (g) a metal depositing step for depositing a metal on the micro-pattern such that the metal allows the micro-pattern to be visually sensed; and
   (h) a protective coating step for applying a protective coating on an upper surface of the deposited metal.

2. The method as claimed in claim 1, wherein the stamper fastening step further comprises fastening the stamper either to the first mold unit or the second mold unit by vacuum absorption.

3. The method as claimed in claim 1, wherein the stamper fastening step further comprises fastening the stamper by means of a clamp provided to the second mold unit.

4. The method as claimed in claim 1, wherein the stamper heating step further comprises raising a surface temperature of the stamper higher than a glass transition temperature of the resin before the resin introducing step.

5. The method as claimed in claim 4, wherein the stamper heating step further comprises putting at least one heater built into one of the first mold unit and the second mold unit into operation, thereby heating the stamper.

6. A method for fabricating a structure having a micro-pattern for an appliance, the structure provided on an object provided to an outside or an inside of a body of the appliance, for changing a light incident thereon from an outside of the appliance to display a predetermined pattern or character, the method comprising:

(a) a stamper fastening step for fastening a stamper having a predetermined pattern arranged between a first mold unit and a second mold unit;

(b) a stamper heating step for heating the stamper;

(c) a mold unit moving step for bringing the first and second mold units into close contact to form an enclosed cavity between the first mold unit and the second mold unit;

(d) a resin introducing step for introducing molten resin to the cavity between the first and second mold units;

(e) a cooling down step for cooling down the first and second mold units and the stamper after finishing the resin introducing step; and (f) a mold unit separating step for making the first and second mold units move away from each other for taking out the structure having the micro-pattern on the stamper transcribed thereto, wherein the stamper heating step comprises raising a surface temperature of the stamper higher than a glass transition temperature of the resin before the resin introducing step, and wherein the stamper cooling down step further comprises bringing a cooling block movably mounted in the second mold unit and separated from the second mold unit into contact with the second mold unit, the stamper being connected to the second mold, thereby cooling the stamper.

7. The method as claimed in claim 6, further comprising the steps of:

depositing a metal on the micro-pattern such that the metal allows the micro-pattern to be sensed visually; and applying a protective coating on an upper surface of the deposited metal.

* * * * *